(12) United States Patent
Kim et al.

(10) Patent No.: US 10,140,716 B2
(45) Date of Patent: Nov. 27, 2018

(54) METHOD OF MOTION SEGMENTATION IN VIDEO USING RANDOMIZED VOTING AND SYSTEM HAVING THE SAME

(71) Applicant: Korea Advanced Institute of Science and Technology, Daejeon (KR)

(72) Inventors: Jun Mo Kim, Daejeon (KR); Hee Chul Jung, Gyeonggi-do (KR)

(73) Assignee: KOREA ADVANCED INSTITUTE OF SCIENCE AND TECHNOLOGY (KR)

( * ) Notice: Subject to any disclaimer, the term of this patent is extended or adjusted under 35 U.S.C. 154(b) by 249 days.

(21) Appl. No.: 14/768,836

(22) PCT Filed: Apr. 30, 2015

(86) PCT No.: PCT/KR2015/004421
§ 371 (c)(1),
(2) Date: Aug. 19, 2015

(87) PCT Pub. No.: WO2015/167292
PCT Pub. Date: Nov. 5, 2015

(65) Prior Publication Data
US 2016/0277732 A1    Sep. 22, 2016

(30) Foreign Application Priority Data

Apr. 30, 2014  (KR) .................. 10-2014-0052413
Apr. 17, 2015  (KR) .................. 10-2015-0054605

(51) Int. Cl.
*G06T 7/11*    (2017.01)
*G06T 7/20*    (2017.01)
(Continued)

(52) U.S. Cl.
CPC .............. *G06T 7/11* (2017.01); *G06T 7/143* (2017.01); *G06T 7/162* (2017.01); *G06T 7/20* (2013.01);
(Continued)

(58) Field of Classification Search
None
See application file for complete search history.

(56) References Cited

U.S. PATENT DOCUMENTS

2007/0185946 A1*  8/2007  Basri ................ G06K 9/34
                                                708/200
2012/0288155 A1   11/2012 Dhawan et al.
2013/0022233 A1*  1/2013  Ma ................... G01S 5/16
                                                382/103

FOREIGN PATENT DOCUMENTS

KR    10-2006-0065417    6/2006
KR    10-2012-0052042    5/2012

OTHER PUBLICATIONS

H. Jung, "[CVPR 2014] Rigid Motion Segmentation using Randomized Voting", available online at https://www.youtube.com/watch?v=yAnRJMLndbY (Mar. 19, 2014).*
(Continued)

*Primary Examiner* — David N Werner
(74) *Attorney, Agent, or Firm* — Blank Rome LLP (57) ABSTRACT

The video-motion segmentation method using a randomized voting is provided which includes receiving the video, extracting a plurality of feature points from the video, and grouping the plurality of feature points by applying a randomized voting method using a score histogram on each of the at least some feature points of the plurality of feature points.

10 Claims, 8 Drawing Sheets

(51) Int. Cl.

| | | |
|---|---|---|
| *G06T 7/143* | (2017.01) | |
| *G06T 7/162* | (2017.01) | |
| *G06T 7/215* | (2017.01) | |
| *H04N 19/51* | (2014.01) | |
| *H04N 19/54* | (2014.01) | |
| *H04N 19/513* | (2014.01) | |
| *H04N 19/543* | (2014.01) | |
| *G06T 7/33* | (2017.01) | |
| *G06T 7/73* | (2017.01) | |
| *G06T 7/246* | (2017.01) | |
| *H04N 19/105* | (2014.01) | |
| *H04N 19/137* | (2014.01) | |
| *H04N 19/139* | (2014.01) | |
| *H04N 19/154* | (2014.01) | |
| *H04N 19/895* | (2014.01) | |

(52) U.S. Cl.
CPC ........... *H04N 19/51* (2014.11); *H04N 19/521* (2014.11); *H04N 19/54* (2014.11); *H04N 19/543* (2014.11); *G06T 7/215* (2017.01); *G06T 7/246* (2017.01); *G06T 7/33* (2017.01); *G06T 7/73* (2017.01); *G06T 2207/10016* (2013.01); *H04N 19/105* (2014.11); *H04N 19/137* (2014.11); *H04N 19/139* (2014.11); *H04N 19/154* (2014.11); *H04N 19/895* (2014.11)

(56) References Cited

OTHER PUBLICATIONS

S.N. Basah, R. Hoseinnezhad, & A. Bab-Hadiashar, "Conditions for motion-background segmentation using fundamental matrix", 3 IET Comp. Vision 189-200 (Year: 2009).*

International Search Report for PCT/KR2015/004421 dated Aug. 13, 2015.

Pundlik et al., "Real-Time Motion Segmentation of Sparse Feature Points at Any Speed", In: Systems, Man, and Cybernetics, Part B: Cybernetics, IEEE Transactions on Jun. 3, 2008, vol. 38, Issue 3, pp. 731-742 ("http://ieeexplore.ieee.org/xpl/articleDetails.jsp?arnumber=4497840&queryTe=t=Real-time+Motion+Segmentation+of+Sparse+Feature+Points+at+Any+Speed&newssharch=true&searchField=Search_All") See pp. 733-735.

* cited by examiner

METHOD OF MOTION SEGMENTATION IN VIDEO USING RANDOMIZED VOTING AND SYSTEM HAVING THE SAME

RELATED APPLICATIONS

This application is a national phase application of PCT/KR2015/004421, filed Apr. 30, 2015, which claims priority to Korean Patent Application No. 10-2014-0052413, filed Apr. 30, 2014 and Korean Patent Application No. 10-2015-0054605, filed Apr. 17, 2015, the entire contents of which are incorporated herein by reference.

TECHNICAL FIELD

The present disclosure relates to a method and a system for segmenting video-motion, and more particularly, to a technique for dividing feature points having different motions or grouping feature points having the same motion.

BACKGROUND ART

Video-motion segmentation may be performed to compress a video, detect a moving object, and analyze a motion as a process for perceiving different motions of an object in the video.

However, motion segmentation in an existing video may not be robust to noise and may be slow in processing speed. Further, the motion segmentation in an existing video may have a problem in that accuracy for segmenting motions gets worse.

In this specification, there may be disclosed a motion segmentation technique using randomized voting, thereby making it possible to be robust to noise and improving a processing speed and accuracy for motion segmentation.

DISCLOSURE

Technical Problem

The present disclosure is directed to provide motion segmentation method and system that are robust to noise and improve a processing speed and accuracy for motion segmentation.

Additionally, the present disclosure is directed to provide video motion segmentation method and system that provide a technique for applying a randomized voting method using a score histogram on each of at least a portion of a plurality of feature points in a motion segmentation process.

Additionally, the present disclosure is directed to provide video motion segmentation method and system that provide a technique for using a minimum of video frames in segmenting a motion by applying a randomized voting method to at least two or more video frames.

Technical Solution

In accordance with an aspect of the present disclosure, a video-motion segmentation method using a randomized voting includes receiving a video; extracting a plurality of feature points from the video, and grouping the plurality of feature points by applying a randomized voting method using a score histogram on each of the at least some feature points of the plurality of feature points.

Additionally, the grouping of the plurality of feature points includes randomly grouping the plurality of feature points based on the predetermined number of groups, selecting the at least some feature points from a plurality of groups, which are obtained by randomly grouping the at least some feature points, based on the predetermined number of feature points selected by the group, obtaining a fundamental matrix on each of the plurality of groups from the at least some feature points, using a sampson distance method to calculate a distance between each of the at least some feature points and a fundamental matrix on each of the plurality of groups, updating the score histogram on each of the at least some feature points based on an objective function defined as the distance, and regrouping the at least some feature points based on the updated score histogram.

Additionally, the updating of the score histogram includes accumulating a score of any group corresponding to a fundamental matrix which minimizes the objective function on the score histogram having an interval corresponding to each of the plurality of groups with respect to the at least some feature points.

Additionally, the regrouping of the at least some feature points includes regrouping each of the at least some feature points into a group corresponding to the highest score on the updated score histogram.

Additionally, the using of the sampson distance method includes accumulating the distance with respect to at least two or more video frames, and the updating of the score histogram comprises updating the score histogram on each of the at least some feature points based on the objective function.

Additionally, the regrouping of the at least some feature points includes using a plurality of groups, which are obtained by regrouping the at least some feature points, in a next process to be repeated, when the randomized voting method is repeated.

Additionally, the regrouping of the at least some feature points includes stopping regrouping the at least some feature points by comparing the number of randomized voting methods performed with a predetermined repetition count or comparing the objective function on at least some feature points selected from the plurality of groups, which are obtained by regrouping the at least some feature points, with a predetermined value.

Additionally, the regrouping of the at least some feature points includes selectively performing a spectral clustering on the at least some feature points.

Additionally, the extracting of the plurality of feature points includes extracting the plurality of feature points through at least two or more video frames.

Additionally, the extracting of the plurality of feature points includes applying a kanade-lukas-tomasi (hereafter referred as to "KLT") method to extract the plurality of feature points from the video.

In accordance with another aspect of the present disclosure, a video-motion segmentation system using a randomized voting includes a video input unit configured to receive a video; a feature point extracting unit configured to extract a plurality of feature points from the video, and a randomized voting method applying unit configured to group the plurality of feature points by applying a randomized voting method using a score histogram on each of the at least some feature points of the plurality of feature points.

Additionally, the randomized voting method applying unit includes a grouping unit configured to group the plurality of feature points based on the predetermined number of groups; a feature point selecting unit configured to select the at least some feature points from a plurality of groups, which are obtained by randomly grouping the plurality of feature points, based on the predetermined number of feature points selected by the group; a fundamental matrix obtaining unit configured to obtain a fundamental matrix on each of a plurality of groups from the at least some feature points, a distance calculating unit configured to use a sampson distance method to calculate a distance between each of the at least some feature points and a fundamental matrix on each of the plurality of groups; a score histogram updating unit configured to update a score histogram on each of the at least some feature points based on an objective function defined as a distance between each of the at least some feature points and the fundamental matrix on each of the plurality of groups, and a regrouping unit configured to regroup the at least some feature points based on the updated score histogram.

Additionally, the score histogram updating unit accumulates a score of any group corresponding to a fundamental matrix which minimizes the objective function on a score histogram having an interval corresponding to each of the plurality of groups with respect to each of the at least some feature points.

Additionally, the regrouping unit regroups each of the at least some feature points into a group corresponding to the highest score on the updated score histogram.

Advantageous Effects

Motion segmentation method and system are robust to noise and improve a processing speed and accuracy for motion segmentation.

Video motion segmentation method and system provide a technique for applying a randomized voting method using a score histogram on each of at least a portion of a plurality of feature points in a motion segmentation process.

Video motion segmentation method and system provide a technique for using a minimum of video frames in segmenting a motion by applying a randomized voting method to at least two or more video frames.

BEST MODE

Mode for Invention

Hereinafter, the attached drawings will be referred to describe an optical logic circuit operating with light reflection control, and a computation device using the optical logic circuit in accordance with embodiments of the present disclosure.

Various embodiments of the present disclosure as described hereinafter are provided to detail features of the present disclosure, not to restrict or concretely define the scope of inventive concept thereof. Rather, it will be properly construed that all of modifications, alterations, or variations derivable by those skilled in the art may be included in the scope of the present disclosure.

Figure 1:
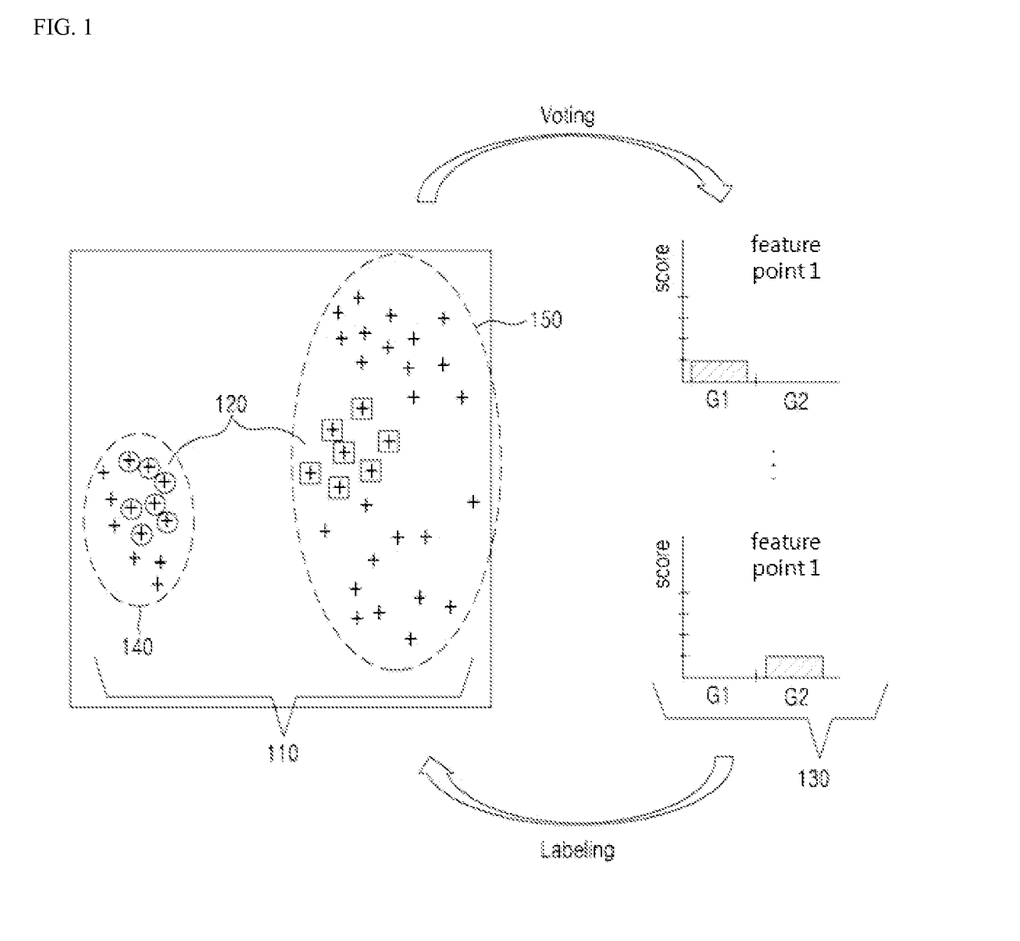
FIG. 1 is a diagram for describing a randomized voting method applied in a video motion segmentation method.

FIG. 1 is a diagram for describing a randomized voting method applied in a video motion segmentation method.

Referring to FIG. 1, a motion segmentation system according to an embodiment of the inventive concept may apply a randomized voting method using a score histogram 130 on each of at least a portion 120 of a plurality of feature points 110 in a motion segmentation process which divides feature points having different motions or groups feature points having the same motion in a video.

Specifically, after randomly grouping the plurality of feature points 110 into a first group 140 and a second group 150, the motion segmentation system may regroup at least a portion 120 of the feature points 110 into a first group 140 or a second group 150 by selecting the at least a portion 120 from a plurality of groups 140 and 150 and utilizing the score histogram 130 on each of the selected feature points 120.

Here, the motion segmentation system may obtain a fundamental matrix on each of the plurality of groups 140 and 150 and update the score histogram 130 on each of the selected feature points 120 based on an objective function defined as a distance between each of the selected feature points 120 and a fundamental matrix on each of the plurality of groups 140 and 150, thereby making it possible to regroup the selected feature points 120 using the updated score histogram 130.

As the randomized voting method is repeated, the selected feature points 120 of the plurality of feature points 110 may be continuously regrouped based on an objective function. Accordingly, feature points having different motions of the plurality of feature points 110 may be divided into different groups, and feature points having the same motion of the plurality of feature points 110 may be classified into the same group. The detailed description on the randomized voting method may be described as follows.

Therefore, the motion segmentation system may perform a motion segmentation method which is robust to noise and improves a processing speed and accuracy by applying the randomized voting method.

FIGS. 2A to 2D are diagrams for describing a video-motion segmentation method according to an embodiment of the inventive concept.

Figure 2A:
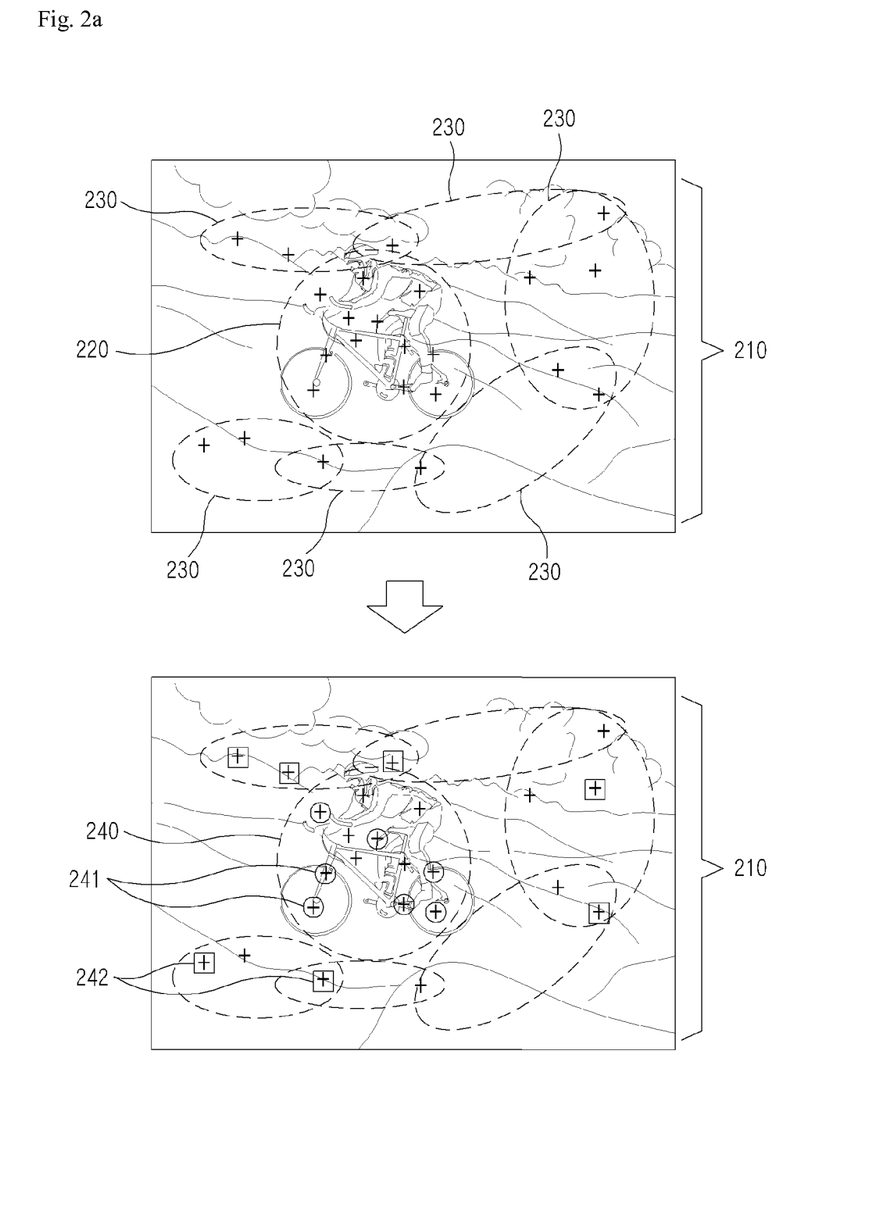
FIGS. 2A to 2D are diagrams for describing a video-motion segmentation method according to an embodiment of the inventive concept.

Referring to FIG. 2A, a motion segmentation system may randomly group a plurality of feature points 210 extracted from a video based on the predetermined number of groups and select at least a portion 240 (illustrated by cross-marks having a circular or rectangular boundary) from a plurality of groups 220 and 230, in which the plurality of feature points 210 are randomly grouped, based on the predetermined number of feature points selected by the group.

For example, when the predetermined number of groups is two and the predetermined number of feature points selected by the group is seven, the motion segmentation system may randomly group the plurality of feature points 210 into a first group 220 and a second group 230, select seven first feature points 241 (illustrated by cross-marks having a circular boundary) from the first group 220, and select seven second feature points 242 (illustrated by cross-marks having a rectangular boundary) from the second group 230.

Figure 2B:
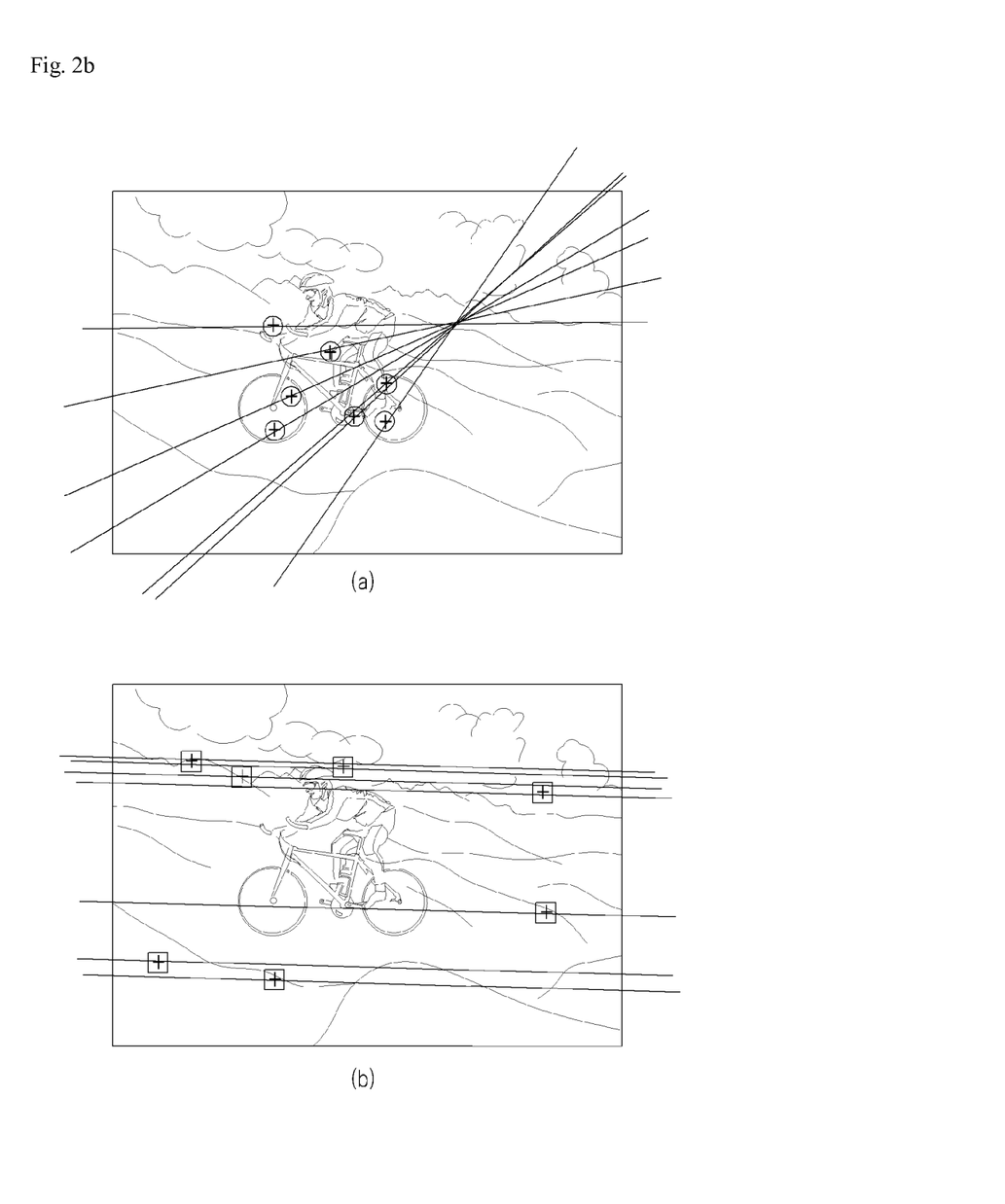

Referring to FIG. 2B, the motion segmentation system may obtain a fundamental matrix on each of the plurality of groups 220 and 230 from at least some feature points 240. Here, a process for obtaining a fundamental matrix may use existing calculating methods. The detailed description on the method may be omitted, because it gets out from the spirit and scope of the inventive concept. Here, the motion segmentation system may obtain a fundamental matrix to correspond to each of the plurality groups 220 and 230. Accordingly, the number of fundamental matrices to be obtained may be the same as the predetermined number of groups.

For example, the motion segmentation system may obtain a first fundamental matrix on the first group 220 from first feature points 241 as illustrated in FIG. 2B (a) and obtain a second fundamental matrix on the second group 230 from second feature points 242 as illustrated in FIG. 2B (b).

Next, the motion segmentation system may use a sampson distance method to calculate a distance between each of at least some feature points 240 and a fundamental matrix on each of the groups 220 and 230. In detail, the motion segmentation system may calculate a distance between each of the at least some feature points 240 and the first fundamental matrix and a distance between each of the at least some feature points 240 and the second fundamental matrix, respectively.

For example, the motion segmentation system may calculate a distance between each of the at least some feature points 240 and a fundamental matrix on each of the groups 220 and 230, using the sampson distance method expressed by the following equation 1.

$$SD(x, y, F) = \frac{y^T F_x}{(F_x)_1^2 + (F_x)_2^2 + (F_y)_1^2 + (F_y)_2^2}$$ [Equation 1]

In Equation 1, SD(x, y, F) may denote a distance between a specific feature point having coordinates (x, y) in a video and a fundamental matrix F. $(F_x)_j^2$ may denote a j-th item of the fundamental matrix $F_x$.

The motion segmentation system may accumulate a distance, which is calculated using the Sampson distance method, between each of the at least some feature points 240 and a fundamental matrix on each of the plurality of groups 220 and 230 with respect to at least two or more video frames.

$$E(X_k, F_g) = \sum_{i=1}^{f} \sum_{j=1}^{f} SD(x_k^{(i)}, x_k^{(j)}, F_g^{(i,j)})$$ [Equation 2]

$$\approx 0$$

In Equation 2, $E(X_k, F_g)$ may denote a value in which a distance between a k-th specific feature point $X_k$ of the at least some feature points 240 and a fundamental matrix $F_g$ is accumulated with respect to at least two or more video frames. Here, because g denotes a group in which the plurality of feature points 210 are grouped, $F_g$ denotes a fundamental matrix corresponding to a group g. $X_k^{(i)}$ may denote a coordinate of a specific feature point $X_k$ in a i-th video frame. $X_k^{(j)}$ may denote a coordinate of a specific feature point $X_k$ in a j-th video frame. $F_g^{(i,j)}$ may denote a fundamental matrix which is obtained from a i-th frame and a j-th frame. f may denote the total number of video frames.

When a specific feature point is grouped into a proper group, a distance between a specific feature point, accumulated with respect to at least two or more video frames, and a fundamental matrix, corresponding to the proper group, may approximate to 0. Therefore, the motion segmentation system may set an objective function, as expressed by Equation 2, using the described characteristic. Here, the objective function may be defined as a distance between each of at least some feature points 240, accumulated with respect to at least two or more video frames, and a fundamental matrix on each of the plurality of groups 220 and 230

Figure 2C:
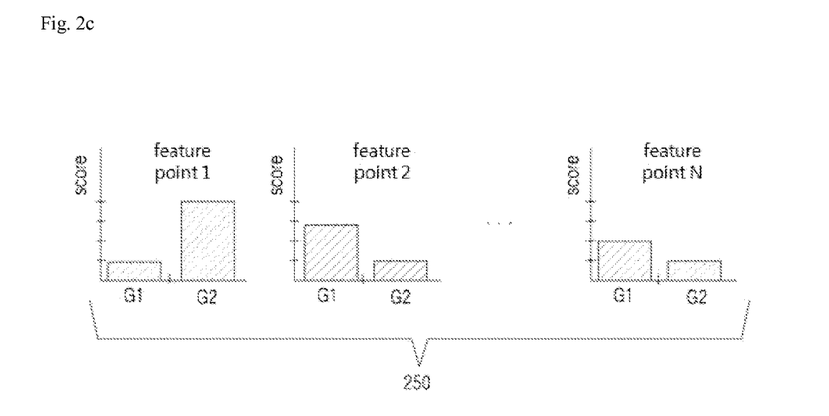

Referring to FIG. 2C, the motion segmentation system may update a score histogram 250 on each of at least some feature points 240 based on an objective function defined as a distance between each of the at least some feature points 240 and a fundamental matrix on each of the groups 220 and 230. Here, the score histogram 250 on each of the at least some feature points 240 may have an interval corresponding to each of the groups 220 and 230.

Specifically, the motion segmentation system may select any group, corresponding to a fundamental matrix which minimizes the objective function, expressed by Equation 2, on the score histogram 250 with respect to each of the at least some feature points 240, according to Equation 3 and accumulate a score of the selected group according to Equation 4, thereby making it possible to update the score histogram 250 on each of the at least some feature points 240.

$$\hat{g} = \underset{g}{\operatorname{argmin}} E(X_k, F_g)$$ [Equation 3]

In Equation 3, $\hat{g}$ may denote any group corresponding to a fundamental matrix which minimizes the objective function.

$$h_i[g] \leftarrow h_i[g] + e^{-\lambda d_i}$$ [Equation 4]

In Equation 4, $d_i$ may be $SD(x_i^{(k)}, F_g^{(k,l)})$ and denote a distance between a i-th specific feature point, having a coordinate $x_i^{(k)}$ in a k-th frame and a coordinate $x_i^{(l)}$ in a l-th video frame, and a fundamental matrix $F_g^{(k,l)}$ obtained from the k-th frame and the l-th frame in the video. λ may denote a parameter for adjusting an accumulation intensity. $h_i[g]$ may denote an interval g of the score histogram 250 on the i-th specific feature point. Here, the interval g may correspond to any group corresponding to a fundamental matrix which minimizes an objective function.

Here, the motion segmentation system may accumulate a score on remaining groups on the score histogram 250 on each of the at least some feature points 240 according to Equation 5 as well as accumulate a score of any group corresponding to a fundamental matrix which minimizes an objective function on the score histogram 250 on each of the at least some feature points 240.

$$h_i[\tilde{g}] \leftarrow h_i[\tilde{g}] - e^{-\lambda d_i} + 1, \text{ for all } \tilde{g} \neq g$$ [Equation 5]

In Equation 5, $h_i[\tilde{g}]$ may denote an interval $\tilde{g}$ of the score histogram 250 on the i-th specific feature point. Here, the interval $\tilde{g}$ may correspond to the remaining groups except for any group corresponding to a fundamental matrix which minimizes an objective function.

That is, the motion segmentation system may relatively more accumulate a score of any group corresponding to a fundamental matrix which minimizes an objective function the score histogram 250 on each of at least some feature points 240 and relatively less accumulate a score on the remaining groups, instead of accumulating only a score of any group corresponding to a fundamental matrix which minimizes an objective function on the score histogram 250 on each of at least some feature points 240.

Figure 2D:
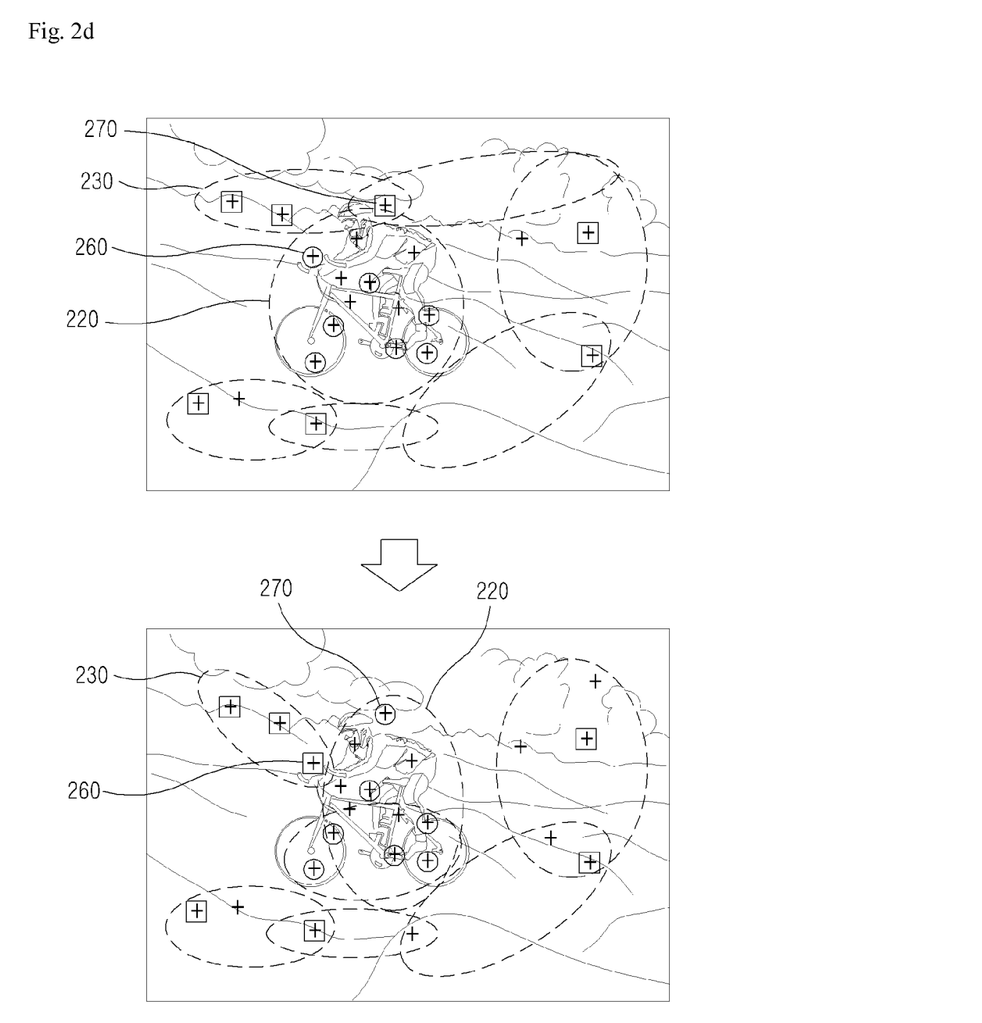

Accordingly, referring to FIG. 2D, the motion segmentation system may regroup each of at least some feature points 240 into a group corresponding to the highest score on the updated score histogram 250 on each of the at least some feature points 240 according to Equation 6.

$$\hat{g} = \underset{g}{\operatorname{argmax}} h_i[g] \text{ for } i = 1, \ldots, n \quad \text{[Equation 6]}$$

In Equation 6, $\hat{g}$ may denote a group, corresponding to the highest score, from among a plurality of groups 220 and 230.

For example, a first feature point 260 may be included in the first group 220 in a first random grouping process. However, when a group corresponding to the highest score on a score histogram on the first feature point 260 is the second group 230, the first feature point 260 may be regrouped into the second group 230. A second feature point 270 may be included in the second group 230 in a first randomly grouped process. However, when a group corresponding to the highest score on a score histogram on the second feature point 270 is the first group 220, the second feature point 270 may be regrouped into the first group 220.

The randomized voting method may be repeated. When the randomized voting method is repeated, a plurality of groups, which are obtained by regrouping at least some feature points 240, may be used in a next process of the randomized voting method. For example, the motion segmentation system may use the plurality of groups 220 and 230 obtained through regrouping of at least some feature points 240 in selecting the at least some feature points 240 from the plurality of groups 220 and 230 in which the plurality of feature points 210 are randomly grouped. Accordingly, the motion segmentation system may select at least a portion from a plurality of groups, in which at least some feature points 240 are regrouped, instead of selecting the at least some feature points 240 from the plurality of groups 220 and 230, in which the plurality of feature points 210 are randomly grouped.

Here, the randomized voting method which is repeated may terminate by comparing the number of randomized voting methods performed with a predetermined repetition count or comparing an objective function on each of at least some feature points selected from the plurality of groups, in which the at least some feature points 240 are regrouped, with a predetermined value. Furthermore, the randomized voting method may terminate by stopping regrouping at least some feature points 240.

Figure 3:
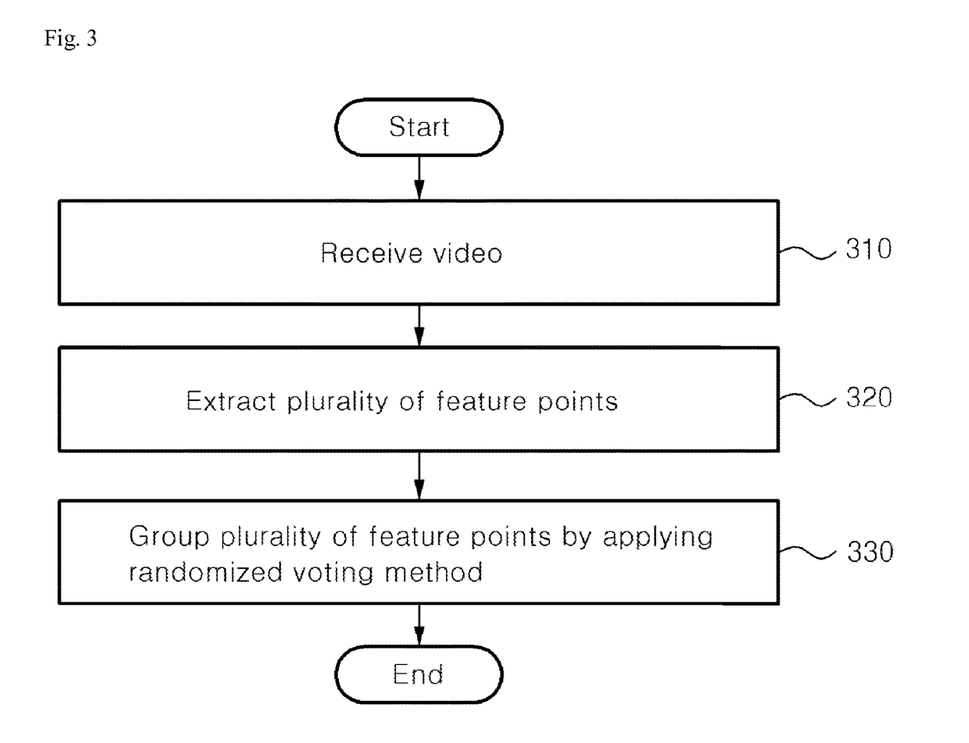
FIG. 3 is a flow chart illustrating a motion segmentation method in a video according to an embodiment of the inventive concept.

FIG. 3 is a flow chart illustrating a motion segmentation method in a video according to an embodiment of the inventive concept.

Referring to FIG. 3, a motion segmentation system according to an embodiment of the inventive concept may receive a video (310).

Next, the motion segmentation system may extract a plurality of feature points from the video (320). Here, the motion segmentation system may extract a plurality of feature points from at least two or more video frames. Moreover, the motion segmentation system may apply a kanade-lukas-tomasi (hereafter referred as to "KLT") method to extract a plurality of feature points from the video.

After that, the motion segmentation system may group a plurality of feature points by applying a randomized voting method using a score histogram on each of at least some feature points of the plurality of feature points (330). This will be more fully described with reference to FIG. 4.

Figure 4:
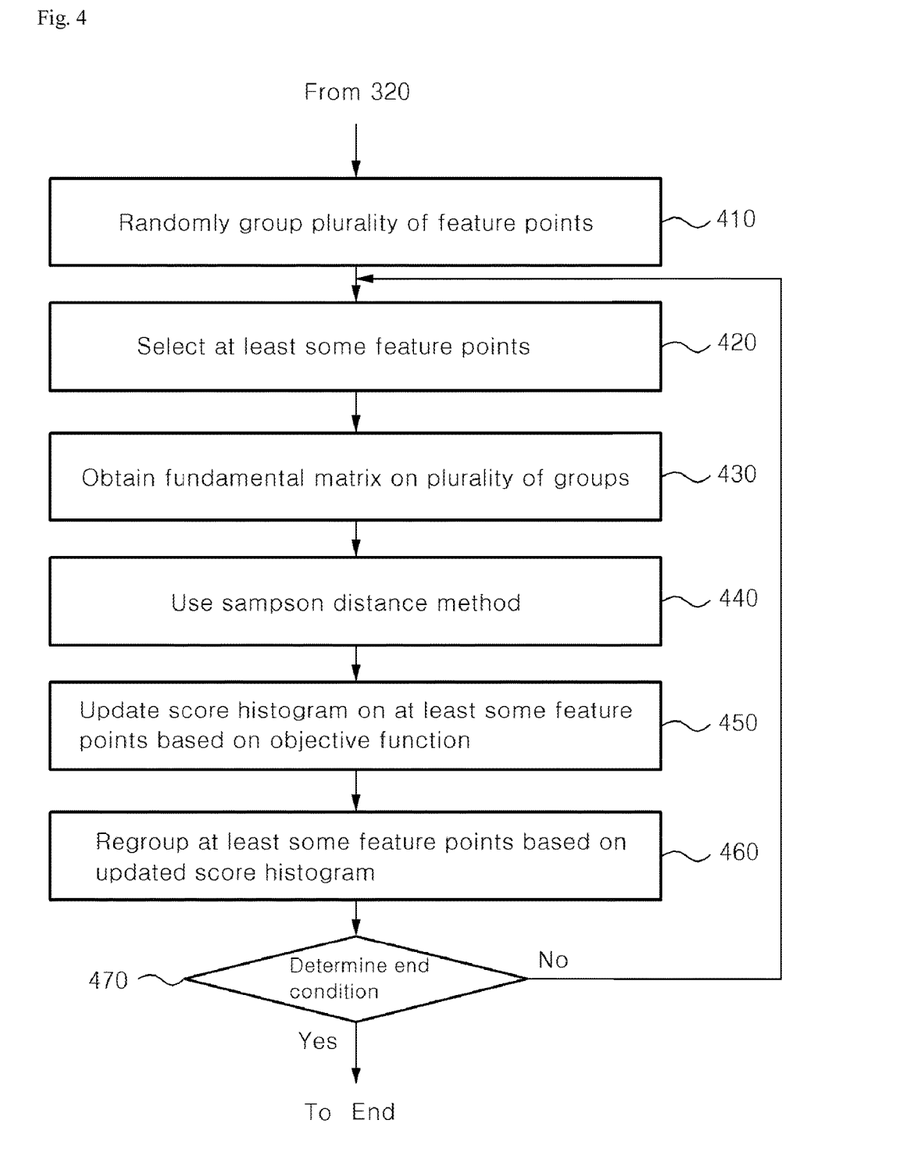
FIG. 4 is a flow chart schematically illustrating grouping of a plurality of feature points using a randomized voting method shown in FIG. 3.

FIG. 4 is a flow chart schematically illustrating grouping of a plurality of feature points using a randomized voting method shown in FIG. 3.

Referring to FIG. 4, the motion segmentation system according to an embodiment of the inventive concept may randomly group a plurality of feature points based on the predetermined number of groups (410).

The motion segmentation system may select at least some feature points from a plurality of groups, which are obtained by randomly grouping the plurality of feature points, based on the predetermined number of feature points selected by the group (420).

Next, the motion segmentation system may obtain a fundamental matrix on each of a plurality of groups from at least some feature points (430).

After that, the motion segmentation system may use a sampson distance method to calculate a distance between each of at least some feature points and a fundamental matrix on each of a plurality of groups (440).

Here, the motion segmentation system may accumulate a distance between each of the at least some feature points and a fundamental matrix on each of a plurality of groups with respect to at least two or more video frames in a process for applying the sampson distance method. Accordingly, when updating a score histogram on each of the at least some feature points (450), the motion segmentation system may update a score histogram on each of the at least some feature points based on an objective function defined as the distance between each of the at least some feature points, which are accumulated with respect to at least two or more video frames, and a fundamental matrix on each of a plurality of groups.

Next, the motion segmentation system may update a score histogram on each of the at least some feature points based on an objective function defined as a distance between each of the at least some feature points and a fundamental matrix on each of a plurality of groups (450).

Here, the motion segmentation system may accumulate a score of any group corresponding to a fundamental matrix which minimizes an objective function on a score histogram having an interval corresponding to each of a plurality of groups, thereby making it possible to update a score histogram on each of the at least some feature points.

After that, the motion segmentation system may regroup the at least some feature points based on the updated score histogram (460). In detail, the motion segmentation system may regroup each of the at least some feature points into a group corresponding to the highest score on the updated score histogram.

Moreover, the motion segmentation system may determine an end condition to repeat or cease the aforementioned randomized voting method (470).

For example, the motion segmentation system may stop regrouping the at least some feature points, by comparing the number of randomized voting methods performed with a predetermined repetition count or comparing an objective function on at least some feature points selected from the plurality of groups, which are obtained by regrouping the at least some feature points, with a predetermined value.

When the randomized voting method is repeated, the motion segmentation system may use a plurality of groups, which are obtained by regrouping the at least some feature points, in the next process to be repeated.

Further, although not shown in figures, when the randomized voting method is ceased, the motion segmentation system may selectively perform spectral clustering on the at least some feature points.

Figure 5:
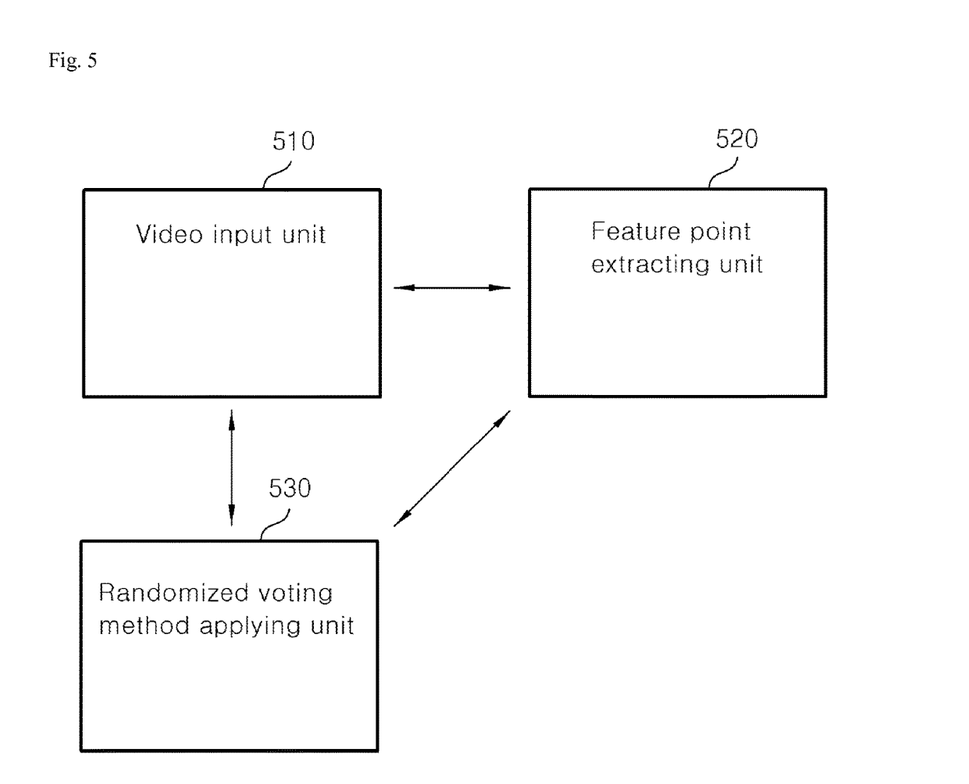
FIG. 5 is a block diagram illustrating a video motion segmentation system according to an embodiment of the inventive concept.

FIG. 5 is a block diagram illustrating a video motion segmentation system according to an embodiment of the inventive concept.

Referring to FIG. 5, a motion segmentation system according to an embodiment of the inventive concept may include a video input unit 510, a feature point extracting unit 520, and a randomized voting method applying unit 530.

The video input unit 510 may receive a video.

The feature point extracting unit 520 may extract a plurality of feature points from the video. Here, the feature point extracting unit 520 may extract a plurality of feature points through at least two or more video frames. Moreover, the feature point extracting unit 520 may use a KLT method to extract a plurality of feature points from the video.

The randomized voting method applying unit 530 may apply a randomized voting method using a score histogram on each of the at least some feature points of the plurality of feature points, to group the plurality of feature points.

Here, although not illustrated in figures, the randomized voting method applying unit 530 may include a grouping unit, a feature point selecting unit, a fundamental matrix obtaining unit, a distance calculating unit, a score histogram updating unit, and a regrouping unit.

The grouping unit may randomly group a plurality of feature points based on the predetermined number of groups.

The feature point selecting unit may select the at least some feature points from a plurality of groups, in which a plurality of feature points are randomly grouped, based on the number of feature points selected by the group.

The fundamental matrix obtaining unit may obtain a fundamental matrix on each of a plurality of groups from at least some feature points.

The distance calculating unit may use a sampson distance method to calculate a distance between each of at least some feature points and a fundamental matrix on each of a plurality of groups.

Here, when applying the sampson distance method, the distance calculating unit may accumulate a distance between each of at least some feature points and a fundamental matrix on each of a plurality of groups with respect to at least two or more video frames, thereby making it possible for the score histogram updating unit to update a score histogram on each of at least some feature points based on an objective function. Here, the objective function may be defined as a distance, which is accumulated with respect to at least two or more video frames, between each of at least some feature points and a fundamental matrix on each of a plurality of groups.

The score histogram updating unit may update a score histogram on each of at least some feature points based on the objective function.

Here, the score histogram updating unit may update a score histogram on each of at least some feature points by accumulating a score of any group corresponding to a fundamental matrix, which minimizes an objective function on a score histogram having an interval corresponding to each of a plurality of groups, with respect to each of at least some feature points.

The regrouping unit may regroup at least some feature points based on the updated score histogram. In detail, the regrouping unit may regroup each of at least some feature points into a group corresponding to the highest score on the updated score histogram.

Moreover, the regrouping unit may determine an end condition to repeat or cease a randomized voting method.

For example, the regrouping unit may cease regrouping the at least some feature points by comparing the number of randomized voting methods performed with a predetermined repetition count or comparing an objective function on each of at least some feature points selected from the plurality of groups, which are obtained by regrouping at least some feature points, with a predetermined value.

When the randomized voting method is repeated, the regrouping unit may use a plurality of groups, which are obtained by regrouping at least some feature points, in the next process to be repeated.

Furthermore, when the randomized voting method is ceased, the regrouping unit may selectively perform a spectral clustering on the at least some feature points.

The aforementioned device may be implemented with a hardware component, a software component, and/or a combination of a hardware component and a software component.

A method according to an embodiment of the inventive concept may be implemented with a program command shape which can be performed through various computer means and be recorded to a computer-readable medium.

We claim:

1. A video-motion segmentation method using a randomized voting, comprising:
   receiving a video;
   extracting a plurality of feature points from the video; and
   grouping the plurality of feature points by applying a randomized voting method using a score histogram on each of at least some feature points of the plurality of feature points;
   wherein the grouping of the plurality of feature points comprises:
      randomly grouping the plurality of feature points based on the predetermined number of groups;
      selecting the at least some feature points from a plurality of groups, which are obtained by grouping the at least some feature points, based on the predetermined number of feature points selected by the group;
      obtaining a fundamental matrix on each of the plurality of groups from the at least some feature points;
      using a sampson distance method to calculate a distance between each of the at least some feature points and a fundamental matrix on each of the plurality of groups;
      updating the score histogram on each of the at least some feature points based on an objective function defined as the distance; and
      regrouping the at least some feature points based on the updated score histogram; and
   wherein a comparison of the locations of the at least some feature points from each of the grouping and the regrouping is used in analyzing movement of an object represented by the at least some feature points.

2. The video-motion segmentation method of claim 1, wherein the updating of the score histogram comprises:
   accumulating a score of a group corresponding to a fundamental matrix, which minimizes the objective function on the score histogram having an interval corresponding to each of the plurality of groups, with respect to the at least some feature points.

3. The video-motion segmentation method of claim 1, wherein the regrouping of the at least some feature points comprises:

regrouping each of the at least some feature points into a group corresponding to the highest score on the updated score histogram.

4. The video-motion segmentation method of claim 1, wherein the using of the sampson distance method comprises:
accumulating the distance with respect to at least two or more video frames, and wherein the updating of the score histogram comprises:
updating the score histogram on each of the at least some feature points based on the objective function.

5. The video-motion segmentation method of claim 1, wherein the regrouping of the at least some feature points comprises:
using a plurality of groups, which are obtained by regrouping the at least some feature points, in a next process to be repeated, when the randomized voting method is repeated.

6. The video-motion segmentation method of claim 1, wherein the regrouping of the at least some feature points comprises:
stopping regrouping the at least some feature points by comparing the number of randomized voting methods performed with a predetermined repetition count or comparing the objective function on each of at least some feature points selected from the plurality of groups, which are obtained by regrouping at least some feature points, with a predetermined value.

7. The video-motion segmentation method of claim 6, wherein the regrouping of the at least some feature points comprises:
selectively performing a spectral clustering on the at least some feature points.

8. The video-motion segmentation method of claim 1, wherein the extracting of the plurality of feature points comprises:
extracting the plurality of feature points through at least two or more video frames.

9. The video-motion segmentation method of claim 1, wherein the extracting of the plurality of feature points comprises:
applying a kanade-lukas-tomasi (hereafter referred as to "KLT") method to extract the plurality of feature points from the video.

10. A non-transitory machine-readable recording medium storing a program for executing a method set forth in claim 1.

* * * * *